United States Patent [19]

Joormann et al.

[11] 4,439,529

[45] * Mar. 27, 1984

[54] GLASS AND GLASS OBJECTS

[75] Inventors: Hendrik J. M. Joormann; Hendrik Verweij; Jan Haisma, all of Eindhoven, Netherlands

[73] Assignee: U.S. Philips Corporation, New York, N.Y.

[ * ] Notice: The portion of the term of this patent subsequent to Sep. 7, 1999 has been disclaimed.

[21] Appl. No.: 298,131

[22] Filed: Aug. 31, 1981

Related U.S. Application Data

[63] Continuation of Ser. No. 119,324, Feb. 7, 1980, abandoned.

[30] Foreign Application Priority Data

May 18, 1979 [NL] Netherlands ........................ 7903914

[51] Int. Cl.³ ................................................ C03C 3/16
[52] U.S. Cl. ...................................... 501/45; 350/409; 350/432; 501/44; 501/48; 501/903

[58] Field of Search ....................... 501/44, 903, 45, 48; 350/409, 432

[56] References Cited

U.S. PATENT DOCUMENTS

| 3,281,253 | 10/1966 | Weidel | 501/48 |
| 3,281,254 | 10/1966 | Weidel | 501/44 |
| 3,485,646 | 12/1969 | Junge | 501/45 |
| 4,285,730 | 8/1981 | Sanford et al. | 501/44 |
| 4,348,484 | 9/1982 | Joormann et al. | 501/45 |

FOREIGN PATENT DOCUMENTS

| 19342 | 11/1980 | European Pat. Off. | 501/45 |
| 1596481 | 6/1971 | Fed. Rep. of Germany . | |

*Primary Examiner*—Helen M. McCarthy
*Attorney, Agent, or Firm*—Paul R. Miller

[57] ABSTRACT

Glasses consisting of 45–55 mol. % $P_2O_5$, 15–40 mol. % BaO, 5–15 mol. % $Li_2O$, 5–35 mol. % PbO, 0–2 mol. % $Al_2O_3$ and 0–6 mol. % F are suitable for the precision pressing of lenses.

6 Claims, No Drawings

GLASS AND GLASS OBJECTS

This is a continuation of application Ser. No. 119,324, filed Feb. 7, 1980, now abandoned.

The invention relates to a glass containing phosphorous pentoxide, lead monoxide, an alkaline earth metal oxide and an alkali metal oxide.

The invention also relates to a method of preparing such a glass and to objects produced therefrom.

The invention particularly provides a new phosphate glass which is suitable for the precision pressing of lenses. Precision pressing is here understood to mean that after pressing the lens does not deviate at any single point of its surface from the desired curvature by more than 0.5 $\mu$m, the surface roughness being less than 0.02 $\mu$m.

Glasses intended for the precision pressing of lenses must satisfy several requirements. The glass must be sufficiently soft so as to have satisfactory pressing characteristics. In the circumstances prevailing during pressing, the glass must not crystallize, that is to say it must be stable. For the practical application of the glass, it is extremely important that the glass should be sufficiently resistant to atmospheric influences (corrosion resistant). Furthermore, colourless glass is generally preferred for lenses.

Phosphate glasses of an optical quality are known from German Patent Specification No. 1,596,841. The known phosphate glasses contain 35–70% by weight of $P_2O_5$, 20–60% by weight of PbO, 2–11% by weight of one or more of the oxides of magnesium, calcium, strontium, barium and aluminium and, possibly, additionally stabilizing quantities of boric acid and/or alkali metal oxide. A quantity of 0.5–2.3% by weight of $B_2O_3$ and/or 1.9% by weight of alkali metal oxide is used to stabilise the glass.

The known glasses are melted and the molten glass is poured into an iron mould. The known glasses do not satisfy the above-mentioned requirements to a sufficient extent. The known glasses have a class 1 corrosion resistance. This means that after having been stored for 1 week at 50° C. in a relative humidity of 99%, the known glasses are not free from stains. In addition, the known glasses are not suitable for precision pressing.

The invention provides a novel type of phosphate glass which is suitable for the precision pressing of lenses.

The invention is based on the recognition of the fact that the above-mentioned requirements can only be satisfied by the choice of one specific alkaline earth metal oxide, the choice of a specific alkali metal oxide and by the choice of specific ranges for the composition of the glass. It particularly appeared that BaO improves the corrosion resistance.

The glass according to the invention is characterized in that the glass contains 45–55 mol.% $P_2O_5$, 15–40 mol.% BaO, 5–35 mol.% PbO, 5–50 mol.% $Li_2O$, 0–2 mol.% $Al_2O_3$ and 0–6 mol.% F in the form of fluoride, that up to 25% of the BaO may be replaced by an equimolar quantity of one or more of the oxides CaO, MgO and SrO and that up to 25% of the $Li_2O$ may be replaced by an equimolar quantity of one or more other alkali metal oxides. Very satisfactory results as regards the above-mentioned properties have been obtained with the following glasses:

45–55 mol.% (preferably 48–52 mol.%) $P_2O_5$,
15–35 mol.% (preferably 18–22 mol.%) BaO,
9–22 mol.% (preferably 18–22 mol.%) PbO,
8.5–11.5 mol.% (preferably 9–11 mol.%) $Li_2O$,
0–2 mol.% $Al_2O_3$ and 0–3 mol.% F in the form of fluoride.

The glasses according to the invention are colourless, satisfactorily pressable (not too hard) and have a corrosion resistance better than class 1 (even after having been stored for 2 weeks at 50° C. in a relative humidity of 99% the glasses according to the invention were free from stains). In addition, the glasses according to the invention are stable, that is to say they do not tend to crystallize during their preparation or during pressing of lenses.

The $P_2O_5$ content in the glass according to the invention was chosen between 45 and 55 mol.%. When the $P_2O_5$ content is below 45 mol.% the glass becomes too hard to allow pressing and is not sufficiently stable. When the $P_2O_5$ content exceeds 55 mol.% the corrosion resistance is insufficient.

The glass according to the invention contains 15–40 mol.% BaO as the alkaline earth metal oxide. Not more than 25% of the BaO may be replaced by one or more other alkaline earth metal oxides. Higher contents of CaO and SrO would cause crystallization, and higher contents of MgO would reduce the corrosion resistance.

A BaO content below 15 mol.% results in an inadequate corrosion resistance. A BaO content of more than 40 mol.% diminishes the stability and reduces the pressability.

A glass according to the invention contains 5–15 mol.% $Li_2O$. When the $Li_2O$ content is less than 5 mol.%, the pressing characteristics and the stability are inadequate. When the quantity of $Li_2O$ exceeds 15 mol.%, the corrosion resistance is too low. Up to 25% of the $Li_2O$ may be replaced by one or more other alkali metal oxides. Inherently, such a replacement results in a reduced corrosion resistance.

As in the case of the known glasses, the glass according to the invention contains PbO. The limits for the PbO have been ascertained on the basis of the following considerations: a PbO content below 5 mol.% results in an insufficient pressability and too low a stability. A content of more than 35 mol.% reduces both the corrosion resistance and the stability.

The glass according to the invention may comprise the customary glass additives. More particularly, the glass may contain 0–2 mol.% $Al_2O_3$ (to improve the stability) and 0–6 mol.% F as fluoride (to improve the pressability).

The glasses according to the invention may be produced in accordance with any customary technique for preparing glass. The carbonates, nitrates etc. of the above-mentioned cations may be used as the starting materials.

EXAMPLE:

Five glasses having the compositions shown in Table A were prepared by fusing appropriate mixtures of starting materials. All glasses had a corrosion resistance better than class 1. None of the glasses had a tendency to crystallize. All glasses were sufficiently soft for pressing operations. The glasses were colourless. Lenses were pressed successfully from these glasses.

TABLE A

| No | (mol. %) | | | | |
|---|---|---|---|---|---|
| | 1 | 2 | 3 | 4 | 5 |
| $P_2O_5$ | 45 | 45 | 49 | 50 | 55 |
| BaO | 22 | 33 | 19,6 | 30 | 27 |
| $Li_2O$ | 11 | 11 | 9,8 | 10 | 9 |
| PbO | 22 | 11 | 19,6 | 10 | 9 |
| $Al_2O_3$ | — | — | 0,5 | — | — |
| F | — | — | 1,5 | — | — |

TABLE B

| No. | (Weight %) | | | | |
|---|---|---|---|---|---|
| | 1 | 2 | 3 | 4 | 5 |
| $P_2O_5$ | 42.6 | 45 | 47.5 | 50 | 55 |
| BaO | 22.5 | 35.5 | 20.5 | 32.3 | 29 |
| $Li_2O$ | 2.2 | 2.3 | 2.0 | 2.1 | 1.9 |
| PbO | 32.7 | 17.2 | 29.6 | 15.7 | 14.1 |
| $Al_2O_3$ | — | — | 0.3 | — | — |
| F | — | — | 0.2 | — | — |

What is claimed is:

1. A glass consisting essentially of phosphorous pentoxide, lead monoxide, an alkali earth oxide, and an alkali oxide, said glass having a composition of 45–55 mol.% $P_2O_5$, 15–40 mol.% BaO, 5–35 mol.% PbO, 5–15 mol.% $Li_2O$, 0–2 mol.% $Al_2O_3$ and 0–6 mol.% F, wherein up to 25% of said BaO may be replaced by an equimolar quantity of at least one of CaO, MgO, and SrO, and wherein up to 25% of said $Li_2O$ may be replaced by an equimolar quantity of at least one other alkali metal oxide, said glass having a corrosion resistance such that after having been stored at 50° C. in relative humidity of 99%, the glass is free from stains.

2. A glass according to claim 1, wherein said glass contains 45–55 mol.% $P_2O_5$, 15–35 mol.% BaO, 9–22 mol.% PbO, 8.5–11.5 mol.% $Li_2O$, 0–2 mol.% $Al_2O_3$, and 0–3 mol.% F.

3. A glass according to claim 1, wherein said glass contains 48–52 mol.% $P_2O_5$, 18–22 mol.% BaO, 18–22 mol.% PbO, 9–11 mol.% $Li_2O$, 0–2 mol.% $Al_2O_3$, and 0–3 mol.% F.

4. Objects including lenses precision pressed from glass having a composition of 45–55 mol.% $P_2O_5$, 15–40 mol.% BaO, 5–35 mol.% PbO, 5–15 mol.% $Li_2O$, 0–2 mol.% $Al_2O_3$ and 0–6 mol.% F, wherein up to 25% of said BaO may be replaced by an equimolar quantity of at least one of CaO, MgO, and SrO, and wherein up to 25% of said $Li_2O$ may be replaced by an equimolar quantity of at least one other alkali metal oxide, said glass having a corrosion resistance such that after having been stored at 50° C. in relative humidity of 99%, the glass is free from stains.

5. Objects according to claim 4, wherein said composition is 45–55 mol.% $P_2O_5$, 15–35 mol.% BaO, 9–22 mol.% PbO, 8.5–11.5 mol.% $Li_2O$, 0–2 mol.% $Al_2O_3$, and 0–3 mol.% F.

6. Objects according to claim 4, wherein said composition is 48–52 mol.% $P_2O_5$, 18–22 mol.% BaO, 18–22 mol.% PbO, 9–11 mol.% $Li_2O$, 0–2 mol.% $Al_2O_3$, and 0–3 mol.% F.

* * * * *